United States Patent [19]

Decker

[11] 3,995,896
[45] Dec. 7, 1976

[54] FLEXIBLE JOINT FOR CONDUIT

[75] Inventor: Maurice S. Decker, Columbus, Ohio

[73] Assignee: Midland-Ross Corporation, Cleveland, Ohio

[22] Filed: Dec. 18, 1974

[21] Appl. No.: 533,883

[52] U.S. Cl. .............................. 285/233; 285/309; 285/369; 285/394; 285/358
[51] Int. Cl.² ...................................... F16L 21/00
[58] Field of Search .......... 285/233, 234, 309, 369, 285/394, 358, 178, 404, 264, 267, 375, 81, 5, 417, 418, 365, 366, 367; 403/343, 18, 20

[56] References Cited
UNITED STATES PATENTS

| | | | |
|---|---|---|---|
| 2,451,437 | 10/1948 | Fenlon | 285/309 X |
| 2,551,550 | 5/1951 | Smith | 285/264 |
| 3,064,503 | 11/1962 | Fry | 403/DIG. 8 |
| 3,405,957 | 10/1968 | Chakroff | 285/81 X |
| 3,451,625 | 6/1969 | Fruktaw | 285/267 X |

*Primary Examiner*—Wayne L. Shedd
*Attorney, Agent, or Firm*—H. Duane Switzer

[57] ABSTRACT

A flexible joint for conduit includes inner and outer conduit members having telescoped end portions. The end portion on one member has a generally spherical surface portion facing toward the end portion of the other member and lying generally on the surface of a sphere having a sphere center intersecting the longitudinal axis of the one member. Sealing means extends from the other conduit member in sealing engagement with the spherical surface portion. Diagonally opposite pivot connections pivotally connect to the two members on a pivot axis which intersects the sphere center. The sealing means remains sealingly engaged with the spherical surface portion during limited pivotal movement of the two conduit members relative to one another about the pivot axis. The pivotal connections include selective adjustment means for moving the two conduit members relative to one another generally parallel to their longitudinal axes for varying the force with which the sealing means and spherical surface portion engage one another.

18 Claims, 4 Drawing Figures

FLEXIBLE JOINT FOR CONDUIT

BACKGROUND

This application pertains to the art of joints and, more particularly, to flexible joints for conduit. The invention is particularly applicable for use in jet engine bleed air duct systems and will be described with reference thereto. However, it will be appreciated that the invention has broader aspects and may be used in any conduit system wherein limited flexing of joints is desirable for relieving high thermal and structural stresses by deflecting under low bend loads.

It is conventional on jet aircraft to bleed air from the engine compressors for such purposes as aircraft air conditioning, heating, pressurization and de-icing. The ducting for such bleed air is subjected to a wide range of temperatures and high bend loads are imposed on duct joints as a result of thermal expansion, particularly, in the ducting takeoff from the bleed pad to common manifolds. In order to withstand the high bend loads, stronger manifolds and joints have been used. However, this simply stiffens the ducting at the joints and bend loads become even greater.

Flexible joints have been proposed for deflecting under the bend loads and such flexible joints have been made using metal bellows. Flexible metal bellows are subject to fatique failure and are not highly reliable. In addition, a metal bellows requires a pneumatic joint on each of its opposite ends.

It would be desirable to have a reliable pneumatic joint which was capable of taking the necessary deflections in ducting of the type described, while being readily assembled and disassembled.

SUMMARY

A flexible joint for conduit includes inner and outer conduit members having telescoped end portions and longitudinal axes. The end portion of one conduit member has a generally spherical surface portion facing toward the other member and lying generally on the surface of a sphere having a sphere center intersecting the longitudinal axis of the one conduit member. Peripheral sliding sealing means extends from the other conduit member for sealingly engaging the spherical surface portion. Diametrically opposite pivot connections between the conduit end portions have a common pivot axis intersecting the sphere center.

In accordance with a preferred arrangement, the pivot connections include selective adjustment means for moving the inner and outer conduit members relative to one another parallel to their longitudinal axes for varying the force with which the spherical surface portion and sealing means engage one another.

In one arrangement, the pivot connections include pins rotatably received in aligned sockets in their inner and outer conduit members. The selective adjustment means includes cam means in the form of an eccentric on the pin for cooperation with the sockets on the conduit member carrying the sealing means. Selective rotation of the pins causes relative movement of the inner and outer conduit members. Releasable locking means is provided for releasably locking the pins against rotation relative to the conduit member carrying the sealing means.

It is a principal object of the present invention to provide an improved flexible joint for conduit.

It is another object of the invention to provide such a flexible joint which is very reliable in operation and substantially eliminates any leakage.

It is a further object of the invention to provide such a flexible joint which has a very high resistance to fatigue failure.

It is an additional object of the invention to provide such a flexible joint which can be readily assembled and disassembled.

Another object of the invention is to provide such a flexible joint which is selectively adjustable for varying the force with which seals engage one another and to tighten the seals as wear occurs.

DESCRIPTION OF PREFERRED EMBODIMENTS

Figure 1:
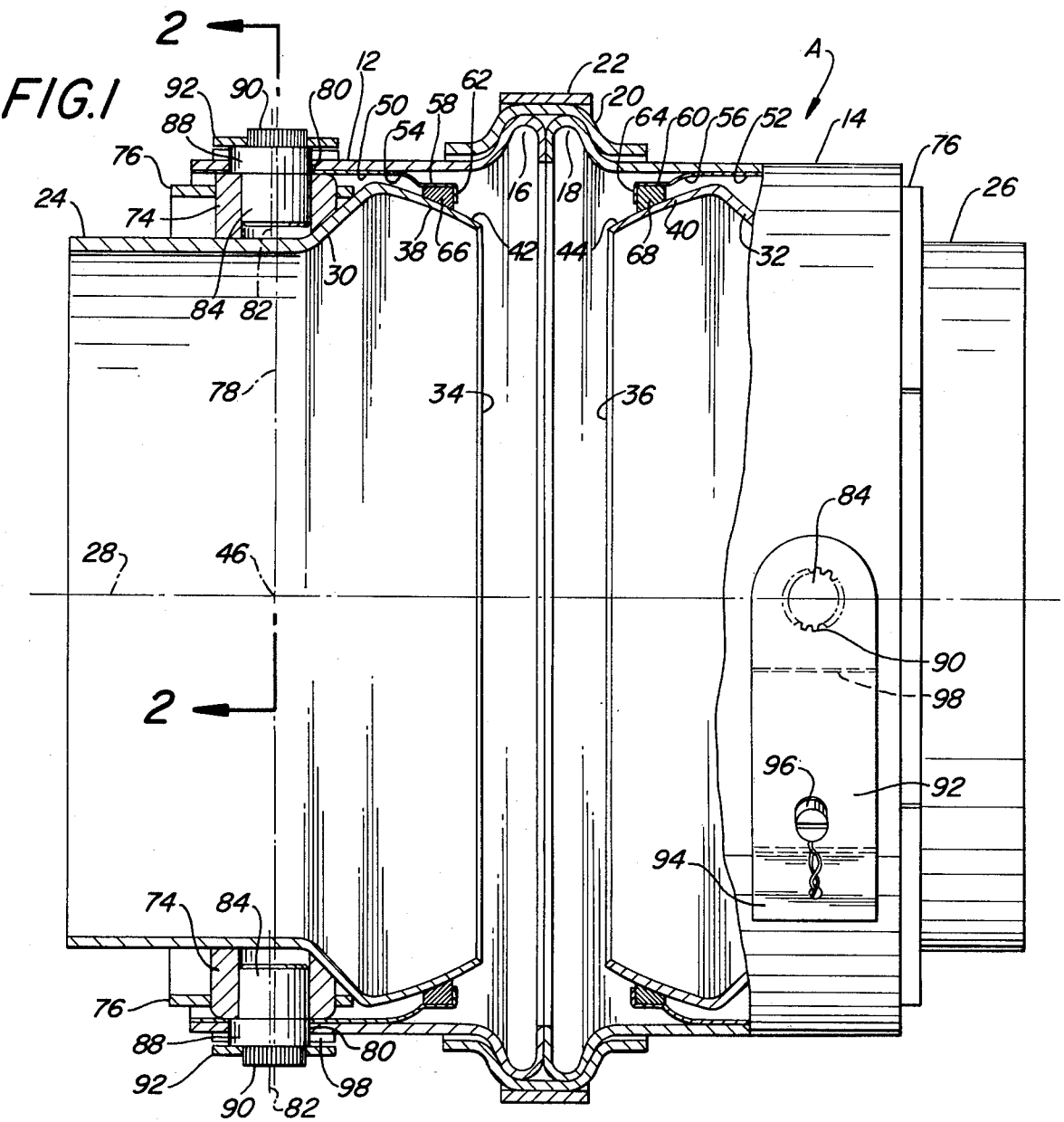
FIG. 1 is a partial cross-sectional elevational view showing the preferred embodiment of an improved flexible joint constructed in accordance with the present invention.

Referring now to the drawing, wherein the showings are for purposes of illustrating preferred embodiments of the invention only and not for purposes of limiting same, FIG. 1 shows a flexible joint including a joining member A comprised of two joining member parts 12 and 14, which may be considered as defining cylindrical outer conduit members. Each joining or outer conduit member 12 and 14 has a reversely curved circumferential end portion as at 16 and 18 acted upon by an actuator ring 20 and a clamping band 22 for effecting a sealed joint in a manner more particularly described in U.S. Pat. No. 2,937,893, issued May 24, 1960, to Hill et al., the disclosure of which is hereby incorporated herein by reference.

Generally cylindrical inner conduit members 24 and 26 have end portions received in the outer end portions of outer conduit members 12 and 14, and have a diameter substantially smaller than the diameter of outer conduit members 12 and 14. The longitudinal axes of conduit members 12, 14, 24 and 26 are substantially coincidental and represented by centerline 28 in FIG. 1.

The inner portions of inner conduit members 24 and 26 are deformed outwardly as at 30 and 32 away from longitudinal axes 28 thereof, and toward inner terminal ends 34 and 36. Such inner end portions are then deformed as at 38 and 40 inwardly toward longitudinal axes 28. Inwardly deformed portions 38 and 40 have generally spherical outer surface portions 42 and 44 which lie on the surface of spheres having sphere centers located on longitudinal axes 28. One such sphere center for inner conduit member 24 is shown generally at 46 as defining the center of the sphere on which spherical outer surface portion 42 lies. Spherical outer surface portion 44 of conduit member 26 also lies on the surface of a sphere having a sphere center lying on the longitudinal axis of conduit member 26. The radius of such sphere is substantially greater than the radius of inner conduit members 24 and 26. Spherical surface portions 42 and 44 face generally outwardly toward outer conduit members 12 and 14.

Cylindrical seal retainers 50 and 52 are welded or soldered to the inner surfaces of joining members 12 and 14. Such seal retainers have inwardly deformed cantilevered portions 54 and 56 which merge into generally cylindrical portions 58 and 60 extending generally parallel to longitudinal axes 28. Circumferential terminal flanges 62 and 64 extend generally perpendicular to longitudinal axes 28. Seal retainers 50 and 52 are formed of very thin sheet metal, such as stainless steel or other corrosion resistant steel alloy having a thickness of around twenty-thousandths inch. This renders such seal retainers resiliently yieldable and slightly deformable, particularly at cantilevered portions 54 and 56.

Each seal retainer 50 and 52 retains a continuous generally circular sealing ring 66 and 68 which are formed of high temperature resistant material such as carbon. However, such sealing rings 66 and 68 can also be formed of a suitable metal or a composite material. In a preferred arrangement, sealing rings 66 and 68 have inner surfaces which also lie on the surface of the same sphere as spherical surface portions 42 and 44.

Each inner conduit member 24 and 26 is pivotally connected to its respective outer conduit member 12 and 14, and such pivotal connections will be described in detail only with respect to inner conduit member 24. It will be recognized that conduit member 26 is similarly pivotally connected to its outer conduit member 14. Inner conduit member 24 has diametrically opposed socket members 74 secured to the outer surface thereof as by securing straps 76. Such socket members 74 include cylindrical sockets having a common longitudinal axis indicated at 78.

Outer conduit members have holes 80 therethrough of a larger diameter than the sockets in socket members 74. Such holes 80 have aligned longitudinal axes 82 which are displaced from axis 78 in a direction away from spherical surface portion 42. Diametrically opposed pins 84 extend through holes 80 in outer conduit member 12 and are rotatably received in the sockets in socket members 74. Pins 84 have longitudinal axes which are coincidental with axis 78. Each pin 84 has an eccentric portion 88 received in holes 80, and having substantially the same size and shape as holes 80. Eccentric portions 88 have longitudinal axes which are coincidental with axes 82. The outer peripheral surfaces of the outer end portions of pins 84 as at 90 have noncircular cross-sectional configurations. In the particular arrangement shown, such outer peripheral surfaces 90 are splined.

Locking means in the form of arcuate plates 92 have holes therethrough of the same size and shape as pin peripheral surfaces 90 for receiving same. In the particular arrangement shown, such holes through plates 92 are splined. Each plate 92 has an outwardly bent tab portion 94 at its end opposite from the hole which receives peripheral surfaces 90 of pins 84. Each locking plate 92 has a suitable hole through which a screw 96 extends freely for reception in aligned threaded holes through outer conduit member 12 and a reinforcing plate 98 welded to the outer surface of conduit member 12.

Longitudinal pivot axis 78 of pins 84 also intersects axes 28 and sphere center 46. Therefore, pivotal movement of conduit 24 about axis 78 maintains spherical surface portion 42 in sealing engagement with sealing ring 66. Obviously, the degree of pivotal movement provided depends upon the difference in diameters of the inner and outer conduits, along with the length of spherical surface portion 42. For purposes of minimizing bend loads in a system of the type described, pivotal movement is provided up to around ±7° while maintaining sealing. Stops may be provided for limiting pivotal movement within the design degree before disengagement between spherical surface portion 42 and sealing ring 66.

The eccentrics on pins 84 define selective adjustment means for selectively moving conduits 12 and 24 relative to one another generally parallel to axes 28 for varying the engagement force between spherical surface portion 42 and sealing ring 66. Screws 96 may be moved for freeing lock plates 92, and grasping tab portions 94 allow rotation of such lock plates along with rotation of pins 84 relative to outer conduit member 12 and sockets 74. Such rotational movement of the pins relative to outer conduit member 12 results in cam action between pin eccentrics 88 and holes 80 for shifting the axes of the eccentrics and holes 80 from the position shown in FIG. 1 toward axis 78 and even to the other side of such axis 78. The thinness of seal retainers 50 and 52 allows yielding deformation thereof under operation of the selective adjustment means in order that sealing rings 66 and 68 will conform with spherical surface portions 42 and 44. Thus, even though there may be slight irregularities or defects in such spherical surface portions or the cooperating surfaces of the sealing rings, the selective adjustment means and the resilient nature of the seal retainers provides firm sealing engagement between the spherical surface portions and sealing rings. The selective adjustment means can be adjusted during initial assembly of the flexible joint and can also be adjusted after a period of operation to further increase the sealing engagement between the spherical surface portions and the sealing rings. Once pins 84 have been rotated to their desired adjusted positions, plates 92 are simply lifted from the end portions of pins 84 and placed back thereon in a position so that the holes therethrough for screws 96 are aligned with the tapped holes through reinforcing plates 98 and outer conduit member 12.

The pivot connection between inner conduit member 26 and outer conduit member 14 is the same as that described with reference to the pivot connection between conduit members 24 and 12. However, the pivot connection between conduit members 14 and 26 is rotatably displaced 90° from pivot axis 78. In other words, the pivot axis for the pins between conduit members 14 and 26 lies in a plane extending perpendicular to axes 28 and such pivot axis extends perpendicular to axis 78. This arrangement is somewhat similar to a gimbal ring so that flexibility of the joint is provided in any direction. The simple securing arrangement for the pivot connections allows ready assembly and disassembly thereof.

Figure 3:
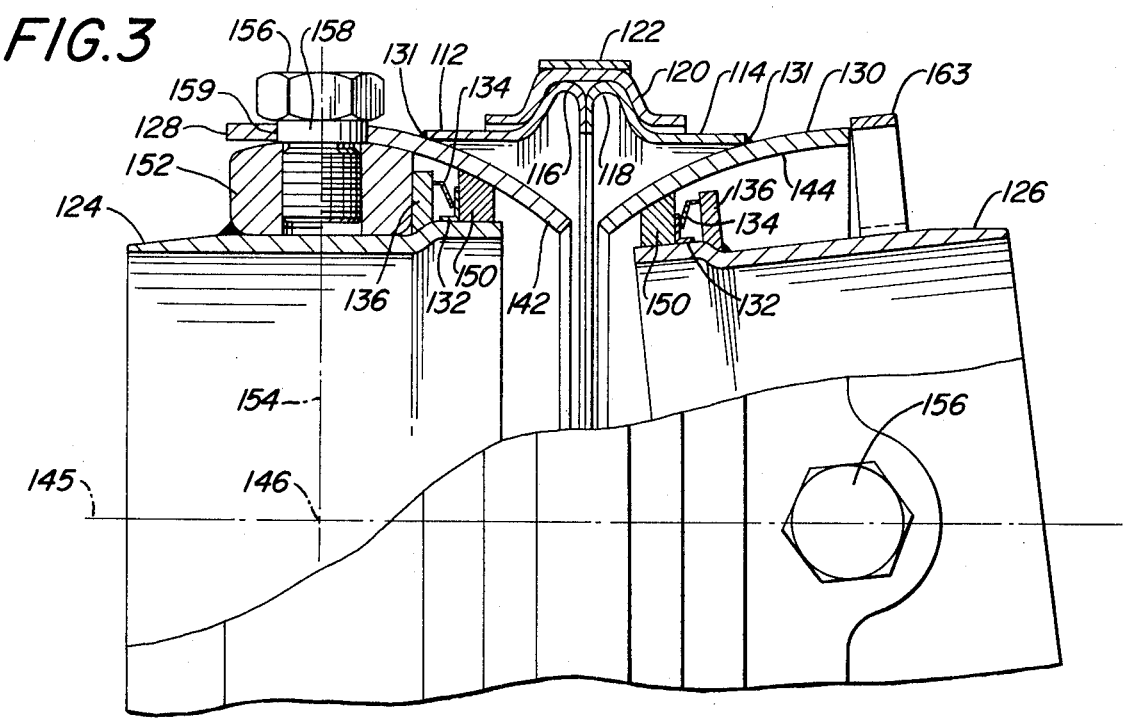
FIG. 3 is a partial cross-sectional elevational view showing another flexible joint constructed in accordance with the present invention.

FIG. 3 shows another arrangement wherein joining or outer conduit members 112 and 114 have reversely curved cooperating end portions 116 and 118 fixed in sealing engagement by an actuator ring 120 and clamp band 122 in the manner previously described. Inner conduit members 124 and 126 have end portions received within circumferentially continuous and longitudinally arcuate members 128 and 130 welded to outer conduit members 112 and 114 as at 131. Such arcuate members have inner spherical surface portions 142 and 144 which lie on the surfaces of spheres having sphere centers intersecting the longitudinal axes 145 of conduits 124 and 126. Only one such sphere center is shown at 146 with respect to conduit 124. Sealing rings 150 are positioned on the outer surfaces of inner conduits 124 and 126 for cooperating sealing engagement with spherical surface portions 142 and 144. Such sealing rings preferably have generally spherical outer surface portions lying on the surface of the same sphere as spherical surface portions 142 and 144. Seal ring retainer members 132 have a generally L-shaped cross-sectional configuration and are biased against rings 150 by resilient cone-like rings 134 which are located between such sealing rings 150 and backup members 136 secured to conduits 124 and 126.

Diametrically opposite socket members are welded or otherwise suitably secured to conduit members 124 and 126. Only one of such socket members is shown at 152 on conduit member 124, and it will be recognized that another such socket member is located diametrically opposite therefrom. Such socket members on conduit member 126 are also diametrically opposite but located on an axis extending perpendicular to axis 154 of the sockets on conduit 124. In the arrangement shown, socket member 152 has a threaded socket receiving a threaded shank on a pin or bolt 156 having a smooth circular portion 158 received in a hole 159 in arcuate member 128. Suitable stop members may be provided for limiting pivotal movement between the inner and outer conduit members, and only one of such stop members is generally shown at 163 on inner conduit member 126.

Axis 154 corresponds to the common pivot axis of pins 156 and such axis also intersects sphere center 146. The pivot axis of the pins on inner conduit member 126 also intersects the center of the sphere on which spherical surface portion 144 thereof lies. The pivot axes of the pins connecting inner conduit members 124 and 126 to outer members 112 and 114 are rotatably displaced 90° from one another so that the joint action is similar to a gimbal ring in which flexing can take place in any direction.

The arrangement described with respect to FIG. 3 does not show any selective adjustment means for varying the force with which sealing rings 150 engage the spherical surface portions. However, it will be recognized that eccentric portions as described with respect to FIG. 1 may also be provided on pins 156 for allowing such selective adjustment.

Figure 4:
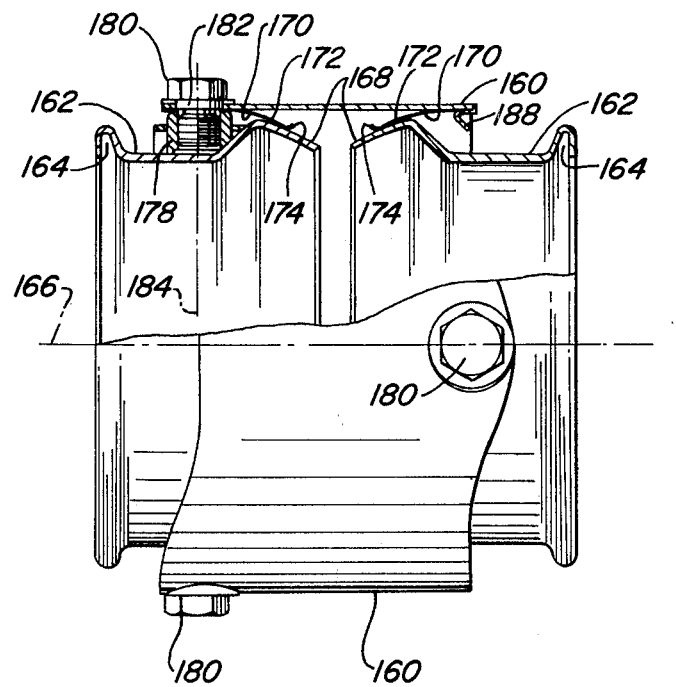
FIG. 4 is a partial cross-sectional elevational view of still another flexible joint.

FIG. 4 shows still another arrangement wherein a generally cylindrical joining member 160 receives inner end portions of conduit members 162. In this arrangement, inner conduit members 162 have reversely bent outer end portions 164 for mating with similar reversely bent portions on adjacent conduits and sealing therewith by use of the actuator ring and clamping band previously described with respect to the Hill et al patent. Inner conduit members 162 have coincidental longitudinal axes shown generally at 166, and the inner end portions thereof are in spaced-apart relationship to allow pivotal movement thereof without contacting one another. The inner end portions of such inner conduit members are outwardly and inwardly bent in the manner described with respect to FIG. 1 for providing outer spherical surface portions 168 which lie on the surfaces of spheres having sphere centers intersecting longitudinal axes 166. Generally cylindrical sheet metal members 170 are secured to the inner surface of joining member 160 and have inwardly deformed cantilevered portions 172 which allow some yielding deformation thereof in order to conform with spherical surface portions 168. The terminal end portions of such sheet metal members are slightly curved as shown at 174 for making sliding sealing engagement with spherical surface portions 168. In this embodiment, there is no carbon or other sealing ring as in the preferred embodiment.

Diametrically opposed socket members are secured to the outer surfaces of inner conduit members 162, and only one of such sockets is shown at 178. Suitable holes through joining member 160 are aligned with the sockets in the socket members for receiving bolts or pins 180 having smooth cylindrical portions 182 received in the holes through joining member 160. Such bolts 180 may be threaded into socket members 178 so that pivotal movement of inner conduit members 162 occurs by pivotal movement of bolts 180 relative to the holes in joining member 160. The pivotal axis of the pins for one inner conduit is shown at 184 and this also intersects the sphere center for spherical surface portion 168. The other inner conduit member is similarly pivotally connected to joining member 160 about a pivot axis rotated 90° relative to axis 184 so that the two inner conduit members pivot on axes which extend generally perpendicular to one another. Suitable stop members may be provided on joining member 160 as shown at 188 for limiting pivotal movement of the inner conduit members before sealing portions 174 are displaced from spherical surface portions 168.

Figure 2:
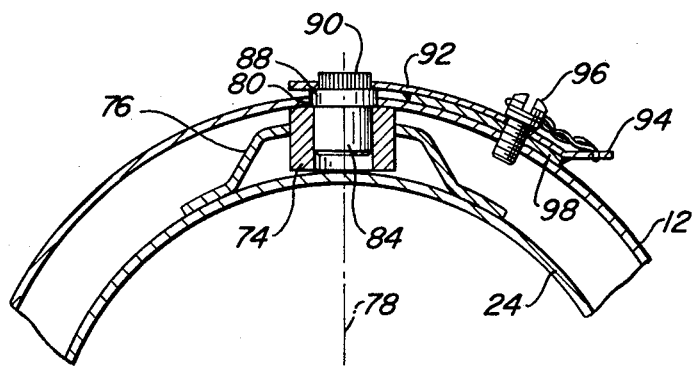
FIG. 2 is a partial cross-sectional view looking generally in the direction of arrows 2—2 of FIG. 1.

In the various embodiments shown and described, the spherical surface portion may be on either the inner or outer conduit member, while the other such conduit member has cooperating sealing means thereon. Diametrically opposite pivotal connections between the inner and outer conduit members provide pivotal movement about a pivot axis which intersects the longitudinal axes of the conduit members and also coincides with the center of the sphere on which the spherical surface portion lies. The selective adjustment means operates simply by rotating the pivot pins relative to the conduit member on which the sealing means is attached. This maintains the pivot axis of the pins coincidental with the sphere center during relative longitudinal movement between the inner and outer conduit members for varying the force with which the spherical surface portion engages the sealing means. The locking means defined by lock plates 92 of FIG. 1 is releasably secured against rotation by releasable securing means defined by screws 96 of FIG. 2. Resilient yielding movement of the sealing means allows same to conform with the shape of the spherical surface portion and maintains good sealing relationship in all pivoted positions of the conduit members.

The various parts are dimensioned so that the sealing rings engage the spherical surface portions generally centrally between the opposite longitudinal end terminations of such spherical surface portions. Operation of the selective adjustment means after assembly of the joint is limited so that the sealing rings are never substantially displaced from such central position.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

The flexible joint is internally pressure balanced. Therefore internal pressure will not tend to straighten the joint once it is deflected. This is because each half of the joint rotates about a symmetrical center line and there is no unbalance of rotational forces due to internal pressure. Forces to deflect the joint are limited to friction only.

I claim:

1. A flexible joint for conduit comprising; a joining member, conduit members each having a longitudinal axis and including a conduit end portion received in said joining member, one of said members having a generally spherical surface portion facing generally toward the other of said members and lying generally on the surface of a sphere having a sphere center located on said longitudinal axis, opposite pivotal connecting means pivotally connecting said joining member and conduit member on a pivot axis which intersects said sphere center, peripheral sealing means on said other member sealingly engaging said spherical surface portion, and said pivotal connecting means including selective adjustment means for moving said members relative to one another parallel to said longitudinal axis and moving said spherical surface portion and said sealing means toward and away from one another while maintaining said pivot axis in intersection with said sphere center.

2. The joint of claim 1 wherein said pivotal connecting means includes aligned sockets in said members, pins rotatably received in said sockets, said selective adjustment means including cam means on said pins cooperating with said sockets on said other member for moving said members relative to one another upon rotation of said pins relative to said other member, and releasable locking means releasably locking said pins against rotation relative to said other member.

3. The joint of claim 2 wherein said locking means includes splined portions on said pins, lock plates having splined holes receiving said splined portions, and releasable securing means releasably securing said lock plates to said other member.

4. The joint of claim 1 wherein said sealing means is of substantially rigid non-elastomeric material and is resiliently yieldable.

5. The joint of claim 1 wherein said sealing means includes a sealing ring of high temperature resistant material engaging said spherical surface portion.

6. The joint of claim 5 wherein said sealing ring is of carbon and said sealing means further includes a thin circumferentially continuous metal member defining resilient yieldable means extending from said other member and engaging said sealing ring and urging said ring into firm sealing engagement with said spherical surface portion.

7. The joint of claim 1 wherein said spherical surface portion is on said conduit member and said pivotal connecting means includes opposite pins secured to said conduit member.

8. The joint of claim 7 wherein said pivotal connecting means includes opposite sockets on said conduit member and opposed holes in said joining member aligned with said sockets, and said pins extending through said holes and being received in said sockets.

9. The joint of claim 8 wherein said selective adjustment means includes cam means on said pins cooperating with said holes for moving said conduit member and joining member relative to one another upon rotation of said pins relative to said joining member, and releasable locking means releasably locking said pins against rotation relative to said joining member.

10. A flexible joint for conduit comprising; a joining member having opposite first end portions, a pair of conduit members having longitudinal axes and conduit end portions received in said first end portions, said conduit end portions together defining second end portions, one of said first and second end portions having generally spherical surface portions facing generally toward the other of said first and second end portions, each said spherical surface portion lying generally on the surface of a sphere having a sphere center located on said longitudinal axes, the other of said first and second end portions having peripheral sealing means sealingly engaging said spherical surface portions, first pivotal connecting means pivotally connecting one of said conduit members and said joining member on a first pivot axis which intersects one of said sphere centers, second pivotal connecting means pivotally connecting the other of said conduit members and said joining member on a second pivot axis which intersects the other of said sphere centers, and said first and second pivot axes lying in substantially parallel planes and extending perpendicular to one another, and said joining member being in two parts which are sealingly connected together in abutting relationship to one another in a plane extending generally perpendicular to said longitudinal axes and located between said spherical surface portions.

11. The joint of claim 10 wherein said pivotal connecting means includes selective adjustment means for selectively moving said joining member and said conduit members relative to one another parallel to said longitudinal axes and moving said spherical surface portions and said sealing means toward or away from one another.

12. A flexible and selectively adjustable joint for conduit comprising; joining and conduit members having telescoped end portions and longitudinal axes, cooperating sliding sealing means between said end portions sealing said end portions during angular movements of said members relative to one another, opposite pivotal connecting means pivotally connecting said end portions together on a pivot axis which intersects said longitudinal axes, selective adjustment means on said pivotal connecting means for selectively moving said members relative to one another generally parallel to said longitudinal axes and varying the engaging force between said cooperating sealing means, said pivotal connecting means including aligned sockets on said end portions and pins rotatably received in said sockets, said selective adjustment means including cam means on said pins cooperating with said sockets on one of said end portions for moving said members relative to one another generally parallel to said longitudinal axes upon rotation of said pins relative to said sockets on said one end portion, and releasable locking means releasably locking said pins against rotation relative to said one end portion while maintaining relative rotation between said pins and the other of said end portions.

13. The joint of claim 12 wherein said releasable locking means includes noncircular portions on said pins, lock plates having noncircular holes receiving said noncircular portions, and releasable securing means releasably securing said lock plates to said one end portion.

14. The joint of claim 12 wherein said cooperating sealing means includes a spherical surface portion on one of said end portions lying generally on the surface of a sphere having a sphere center located generally at the intersection of said pivot axis with said longitudinal axes.

15. A flexible joint for conduits comprising; a joining member having a longitudinal axis and being formed from two parts which are sealingly connected together in a plane extending generally perpendicular to said axis, generally spherical surface portions on each of said parts on opposite sides of said plane and facing toward said axis, said spherical surface portions curving outwardly away from said axis from locations adjacent said plane and having sphere centers intersecting said axis, a pair of conduits having end portions received in said parts, pivotal connecting means pivotally connecting said conduit end portions to said parts on pivot axes intersecting said sphere centers and lying in planes extending generally perpendicular to said axis, said pivot axes extending generally perpendicular to one another, circumferential sealing means on each of said end portions of said conduits engaging said spherical surface portions, and yieldable biasing means carried by said end portions biasing said sealing means on each said end portion toward said plane in which said two parts are connected together and into firm sealing engagement with said spherical surface portions.

16. A flexible joint for conduits comprising; a generally cylindrical joining member having a longitudinal axis and opposite joining end portions, a pair of conduits having conduit end portions received in said joining end portions, said conduit end portions having outer spherical surface portions lying on the periphery of spheres having sphere centers intersecting said axis, pivotal connecting means connecting said conduit end portions to said joining member on pivot axes intersecting said sphere centers and lying in planes extending perpendicular to said axis, said axes extending perpendicular to one another, generally cylindrical sheet metal members secured to said joining member interiorly thereof and having cantilevered terminal portions extending inwardly toward said axis and providing yielding deformation of said cantilevered terminal portions and sealing means sealingly engaging between said cantilevered terminal portions and said spherical surface portions.

17. The joint of claim 16 wherein said sealing means comprises curved portions having inner surfaces on said cantilevered terminal portions engaging said spherical surface portions.

18. The joint of claim 16 wherein said sealing means comprises a sealing ring of high temperature resistant material positioned between each said cantilevered terminal portion and each said spherical surface portion.

* * * * *